Nov. 4, 1930.  L. L. SCHOOLING  1,780,404
WHEEL
Filed Dec. 9, 1927
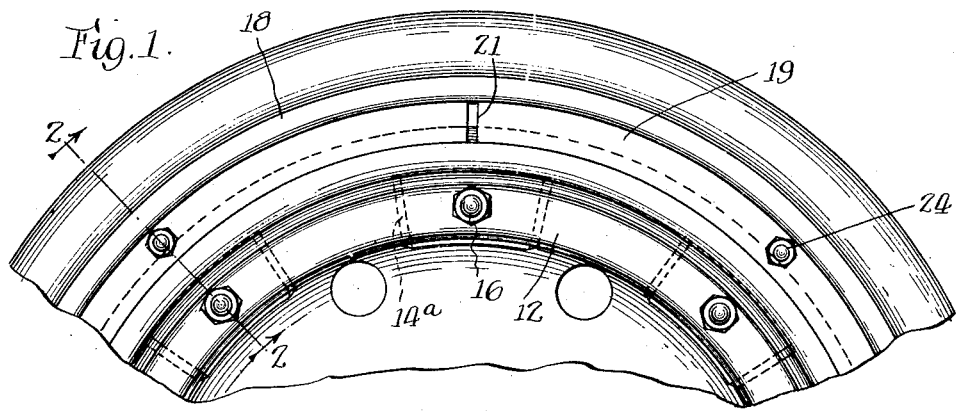
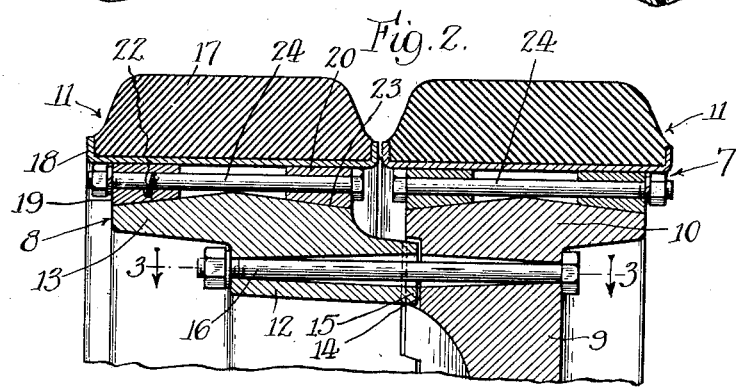
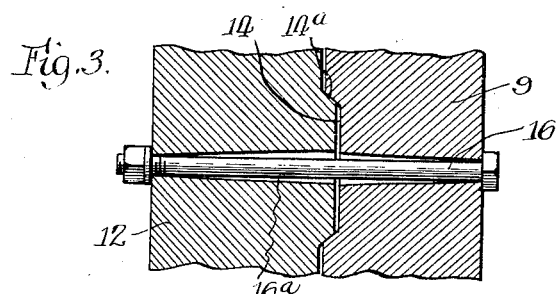
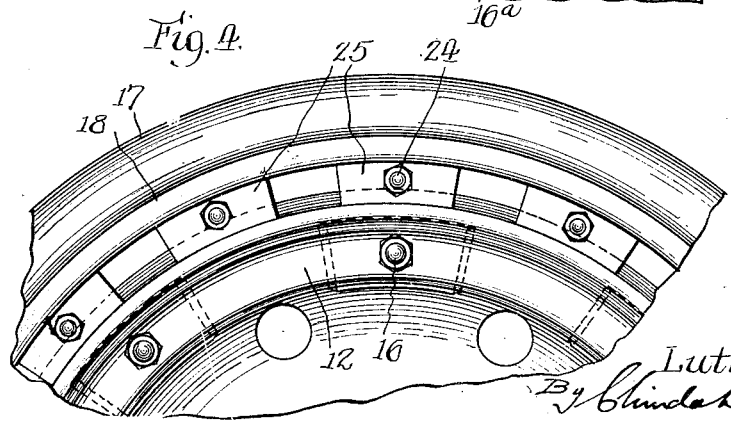
Inventor:
Luther L. Schooling Patented Nov. 4, 1930

1,780,404

UNITED STATES PATENT OFFICE

LUTHER L. SCHOOLING, OF QUINCY, ILLINOIS, ASSIGNOR TO ELECTRIC WHEEL COMPANY, OF QUINCY, ILLINOIS, A CORPORATION OF ILLINOIS

WHEEL

Application filed December 9, 1927. Serial No. 238,821.

The invention relates to wheels of the type employed on trucks, tractors, trailers and the like, and more especially relates to wheels equipped with hard rubber tires.

One object is to provide means for detachably mounting a demountable tire upon the cast body of a wheel in a manner such as to avoid machining the latter.

Another object is to provide a novel construction for a dual wheel comprising a main wheel having a solid cast body and a lateral extension therefor, also of cast construction, so as to provide means of advantageous character for detachably securing the two sections of the wheel together so as to hold them firmly in proper operative relation.

A further object is to provide means for detachably but firmly connecting the two body sections of a dual wheel together including interfitting recesses and projections formed on the respective sections shaped so that when the two sections are clamped together with the projections engaging in the recesses the sections are firmly held in concentric relation, the construction furthermore being such as to avoid the necessity of machining the interengaging parts.

The objects of the invention thus set forth, together with other and ancillary advantages, are attained by the construction and arrangement illustrated in the accompanying drawings forming part hereof. It is to be understood, however, that it is contemplated that various changes in the construction and arrangement set forth may be made by those skilled in the art without departing from the spirit and scope of the invention as expressed in the appended claim.

Figure 1 of the drawings is a fragmentary side elevational view of my improved wheel.

Fig. 2 is a transverse sectional view taken approximately in the plane of line 2—2 of Fig. 1.

Fig. 3 is a sectional view taken in the plane of line 3—3 of Fig. 2.

Fig. 4 is a view similar to Fig. 1 but showing a modified form of construction.

The wheel herein shown is of the dual type comprising a main section 7 and an auxiliary section constituting a lateral extension 8. The main section of the wheel is herein shown in the form of a cast body 9 which may comprise a disk adapted for support upon an axle in the usual way. The periphery of the body 9 is shaped to provide an annular member 10 carrying a demountable tire 11.

The lateral extension 8 comprises an annular cast ring 12 which also has formed thereon an annular peripheral member 13 adapted to carry a demountable tire 11.

The means for detachably securing the body 9 of the main section and the annular body 12 of the auxiliary section together comprises in the preferred form of my invention interfitting recesses and projections formed respectively on the two wheel sections. In the present instance, the body member 9 of the main section has a plurality of recesses 14 formed therein near its periphery and within the annular member 10. The projections 15 are accordingly formed on the body 12 of the lateral extension 8, being spaced in accordance with the spacing of the recesses 14 so that the projections are adapted to interengage with the recesses. As shown in Figs. 1 and 3, the side walls 14ª of the recesses as well as the side walls of the projections are inclined and also tapered inwardly, and the projections are proportioned in size with respect to the recesses so that the projections are unable to seat in the bottoms of the recesses. In other words, the interengagement between the projections and recesses occurs at the sides only, these being inclined to produce a wedging action when two sections of the wheel are clamped together.

The clamping or fastening means herein shown comprises a series of bolts 16 passing through the annular bodies 9 and 12 of the two sections at points substantially centrally of the recesses 14. It will be observed that by tightening the bolts the two sections become centered relative to each other and thus are firmly held in concentric relation. Also it will be seen that the apertures 16ª through which the bolts 16 extend are tapered in the case of each of the wheel sections toward the interengaging projections and recesses so as to be somewhat larger than the diameter of the bolt at the meeting edges of the two sections. This facilitates the assembling of the two sections together, the bolts when inserted serving to draw the sections into concentric relation.

The demountable tires 11 may be of standard form consisting of the tire proper designated 17, mounted in a suitable metallic annular base 18 which herein is channel shaped and of uniform diameter throughout its width. The annular members 10 and 13 are made of a diameter substantially less than the internal diameter of the tires, and interposed between the channel base 18 of each tire and the annular member of the corresponding wheel body are a plurality of wedge members 19 and 20. In the form shown in Figs. 1 and 2, the wedge members 19 and 20 are in the form of rings split at 21 and having their inner faces inclined to coact with oppositely inclined wedging surfaces 22 and 23 formed on the outer periphery of each of the annular members 10 and 13. The wedge rings 19 and 20 are made of substantial thickness and provided with transverse apertures through which a plurality of bolts 24 extend, said bolts being of a length to pass through both of the wedge rings. It will be observed that by tightening the bolts the wedge rings are drawn toward the center of each of the annular members 10 and 13, the rings being permitted to expand due to the fact that they are split as above set forth.

The construction is simple and practical because the wedging surfaces 22 and 23 are formed only on the body of the wheel, and may be formed sufficiently smooth by casting in a chill, thus avoiding the necessity of machining such surfaces.

In Fig. 4 I have shown in place of two wedge members in the form of split rings, a plurality of relatively narrow or segmental wedge members 25 arranged in opposing pairs similar to the members 19 and 20, with each pair connected by an operating bolt 24, the pairs of members being spaced apart substantially equidistantly about the wheel.

The entire construction is advantageous because of its simplicity and hence low cost of manufacture and because of the rigidity with which the parts are secured together.

I claim as my invention:

In a wheel including a main section and an auxiliary section constituting a lateral extension thereof, the adjacent sides of said sections being formed with interfitting projections and recesses, the different sets of coacting projections and recesses being located at substantially opposite points about the axis of the wheels, the projections and recesses of each set being formed with inclined coacting surfaces adapted to effect relative angular and radial alinement of said sections, and bolt means to secure said sections in interfitting engagement, said sections having apertures formed therein to receive said bolts the diameters of said apertures in the planes of the adjacent faces of the sections being relatively greater than the diameters of said bolts to prevent slight relative displacement of the wheel sections from obstructing passage of said bolts through said apertures.

In testimony whereof, I have hereunto affixed my signature.

LUTHER L. SCHOOLING.